US010723327B2

(12) United States Patent
Belanger et al.

(10) Patent No.: US 10,723,327 B2
(45) Date of Patent: Jul. 28, 2020

(54) DUAL SCRUBBER VEHICLE TREATMENT BRUSH ASSEMBLY

(71) Applicant: WashMe Properties, LLC, Northville, MI (US)

(72) Inventors: Michael J. Belanger, Northville, MI (US); Jerry A. Kotrych, Livonia, MI (US); David L. Tognetti, Howell, MI (US)

(73) Assignee: Belanger inc., Northville, MI (US)

( * ) Notice: Subject to any disclaimer, the term of this patent is extended or adjusted under 35 U.S.C. 154(b) by 71 days.

(21) Appl. No.: 15/067,423

(22) Filed: Mar. 11, 2016

(65) Prior Publication Data

US 2016/0264105 A1    Sep. 15, 2016

Related U.S. Application Data

(63) Continuation-in-part of application No. 14/691,686, filed on Apr. 21, 2015, now Pat. No. 9,776,600, and a continuation of application No. 14/327,744, filed on Jul. 10, 2014.

(60) Provisional application No. 61/972,854, filed on Mar. 31, 2014, provisional application No. 61/972,764, filed on Mar. 31, 2014.

(51) Int. Cl.
| | |
|---|---|
| *B60S 3/06* | (2006.01) |
| *A46B 13/04* | (2006.01) |
| *A46B 13/00* | (2006.01) |
| *B60S 3/04* | (2006.01) |

(52) U.S. Cl.
CPC ............ *B60S 3/066* (2013.01); *A46B 13/001* (2013.01); *A46B 13/008* (2013.01); *A46B 13/04* (2013.01); *B60S 3/042* (2013.01); *B60S 3/06* (2013.01); *A46B 2200/3046* (2013.01)

(58) Field of Classification Search
None
See application file for complete search history.

(56) References Cited

U.S. PATENT DOCUMENTS 2,153,207 A * 4/1939 Petty .................... A46B 13/008
                                                          15/180
2,716,767 A * 9/1955 Davis ...................... B60S 3/042
                                                          134/123
(Continued)

*Primary Examiner* — Katelyn B Whatley
(74) *Attorney, Agent, or Firm* — Dickinson Wright, PLLC

(57) ABSTRACT

A rotary brush assembly for use in a vehicle wash system, including a base portion, a linkage portion in rotational communication with the base portion and a treatment portion moveable between a first position extended into the vehicle treatment area for engagement with an exterior of a vehicle and a second position retracted from a vehicle treatment area. The treatment portion includes a brush assembly configured to rotate about an axis of rotation. The brush assembly has a backing member, a plurality of media elements secured to the backing member, and a plurality of spray nozzles encapsulated within the plurality of media elements. A plurality of pockets formed on the brush assembly where none of the first plurality of media elements are disposed. The plurality of spray nozzles being disposed at an angle to direct separate streams of high pressure fluid away from the axis of rotation and through the area of the pockets such that the separate streams are substantially not obstructed by any of the plurality of media elements.

17 Claims, 12 Drawing Sheets

(56) References Cited

U.S. PATENT DOCUMENTS

| | | | | |
|---|---|---|---|---|
| 6,408,480 B1 * | 6/2002 | Wiemann | ............. | B24D 13/145 |
| | | | | 15/230.12 |
| 2009/0241989 A1 * | 10/2009 | MacNeil | .................. | A46B 9/02 |
| | | | | 134/6 |
| 2013/0291906 A1 * | 11/2013 | Belanger | ................. | B60S 3/042 |
| | | | | 134/123 |

* cited by examiner

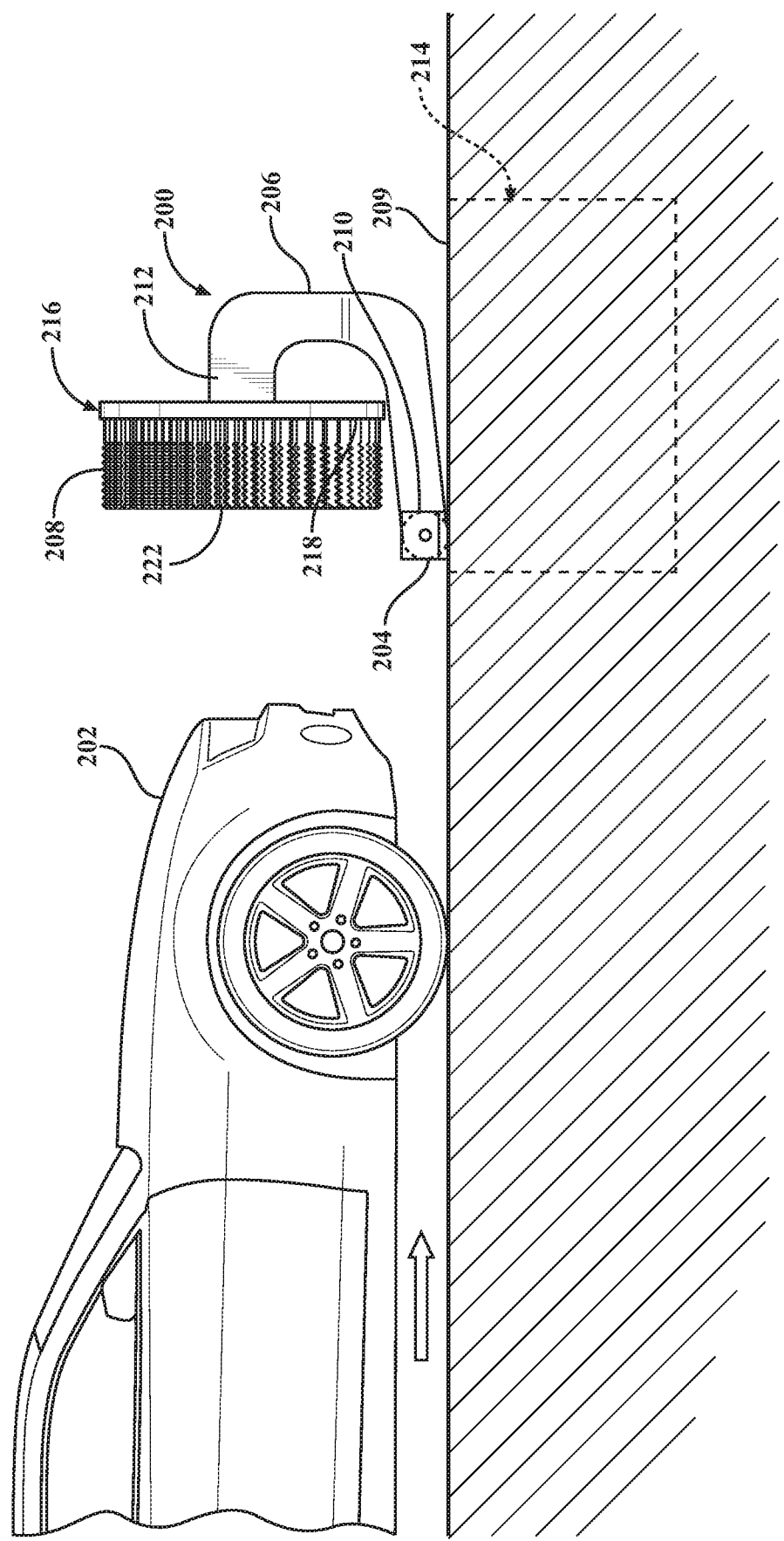

DUAL SCRUBBER VEHICLE TREATMENT BRUSH ASSEMBLY

CROSS-REFERENCE TO RELATED APPLICATIONS

The present application is a continuation-in-part of U.S. patent application Ser. No. 14/691,686, filed Apr. 21, 2015 and entitled "Vehicle Wash Component with Torque Reactor", which is a continuation-in-part of U.S. patent application Ser. No. 14/327,744, filed Jul. 10, 2014 and entitled "Pad Element For A Rotary Brush Vehicle Wash Component", which claims priority to U.S. Provisional Patent Application Ser. No. 61/972,764, entitled "Rotary Brush Apparatus for a Vehicle Wash System", filed on Mar. 31, 2014 and U.S. Provisional Patent Application Ser. No. 61/972,854, entitled "Rotary Brush Apparatus", filed on Mar. 31, 2014, the disclosures of which are all hereby incorporated by reference.

TECHNICAL FIELD

The present disclosure relates generally to a vehicle treatment apparatus for treating an exterior surface of a vehicle. More specifically, the present disclosure relates to a rotary brush assembly for treating an exterior surface of a vehicle that utilizes wash media elements in combination with a supply of high pressure fluid to more effectively clean a vehicle exterior, including areas that are typically difficult to clean effectively.

BACKGROUND OF THE INVENTION

Typical vehicle wash systems utilize a variety of vehicle treatment components, including different types of rotary brushes, miter curtains and the like to help remove dirt from a vehicle exterior as part of the wash process. These vehicle wash systems also generally include a high pressure rinse arch to spray water onto the vehicle to help loosen any dirt accumulated thereon. However, the high pressure water is generally emitted from a location disposed away from a vehicle and thus is not completely effective in removing dirt from the vehicle exterior. As such, most vehicle wash facilities include manual washing of the vehicle exterior as a first step in the wash process, including wheels, rocker panels, bumpers and other notoriously hard to clean surfaces to help loosen dirt accumulated thereon so that the wash process may be more effective. Additionally, these systems also generally include nozzles for emitting soap and other chemicals onto the vehicle exterior at various stages of the wash process to assist with the cleaning process as well as to help minimize damage to the vehicle exterior by ensuring that the wash media elements associated with the various vehicle treatment components do not contact a dry vehicle surface. These systems also generally include one or more dryers that are designed to remove excess water from the vehicle surface at the conclusion of the wash process.

A common type of rotary brush apparatus frequently used in these vehicle wash systems include a plurality of media elements that contact, scrub, and clean exterior surfaces of vehicles. These rotary brushes typically include a rotary hub portion with an axis of rotation that is oriented parallel to a vehicle exterior. As the rotary hub is driven about its axis of rotation, the plurality of media elements blossom generally outward (perpendicular with respect to the axis of rotation) due, in part, to centrifugal force, so that they can contact a vehicle exterior to remove dirt and debris and effectuate cleaning. To apply increased scrubbing and cleaning, the rotary hub can be rotated faster to increase the speed at which the media elements contact the vehicle exterior. This generally creates an increased slapping noise due to an increased force of contact between the media elements and the vehicle exterior, which can make the car wash experience unenjoyable for a user. Also, as the speed of the brush increases, the perception of potential damage to the vehicle exterior increases.

These rotary brush apparatuses are generally configured such that the media elements are oriented generally perpendicular to the brush axis of rotation during use. As such, as the rotary hub is driven, the media elements typically only contact the vehicle exterior in a single direction, which limits the cleaning capabilities of the media elements and thus the effectiveness of the wash process. For example, with respect to a conventional side brush apparatus, as the hub rotates, the media elements are configured to contact a side exterior surface of the vehicle in only one direction, i.e., a front to back direction. In other words, the media elements contact a forward part of the exterior surface and move backward along the vehicle exterior before losing contact therewith. As such, any force applied to the vehicle exterior to remove dirt and debris is applied on only a single direction. These rotary brushes are known to have limitations in removing dirt from angled, curved or complex vehicle surfaces, such as wheels or rocker panels.

Rotary brushes having an axis of rotation which is oriented generally perpendicular to a vehicle exterior are also known, for cleaning vehicle wheels. However, these brushes employ hard or rigid media elements, such as synthetic bristles. As the bristles can mar a painted surface, they are not suitable for cleaning or treating a vehicle exterior. Moreover, these rotary brush assemblies also include a rigid hub or backing portion. Thus, if the media elements secured to these rigid structures encounter angled or curved exterior vehicle surfaces, the brush assemblies cannot accommodate these variations and thus are not suitable for use for cleaning a vehicle exterior for this additional reason.

It would therefore be desirable to provide a rotary brush assembly that yields improvements over these deficiencies.

SUMMARY OF THE INVENTION

It is therefore an aspect of the present disclosure to provide a rotary brush assembly for a vehicle wash system that can provide improved cleaning of a vehicle exterior surface.

It is another aspect of the present disclosure to provide a rotary brush assembly for a vehicle wash system that more effectively removes drift from hard to clean surfaces of a vehicle exterior, including wheels, rocker panels, and lower portions of doors and fenders.

It is still another aspect of the present disclosure to provide a rotary brush assembly that decreases the number of components required in a vehicle wash system to clean a vehicle exterior.

It is still a further aspect of the present disclosure to provide a rotary brush assembly for a vehicle wash system that utilizes a high pressure fluid to assist in removing dirt during a vehicle wash process.

In accordance with the above and the other aspects, a rotary brush assembly for a vehicle wash system is provided. The assembly includes a base portion and a treatment portion pivotally connected to the base portion. The treatment portion includes a brush assembly, a motor portion, and a plurality of spray nozzles. The brush assembly includes a shaft portion and a brush portion secured to an end of the stem portion. The brush portion includes a backing member with a plurality of wash media elements extending outwardly therefrom. The motor portion is in communication with the brush assembly to effectuate rotation thereof about an axis of rotation. The spray nozzles are disposed adjacent the backing member and are configured to emit high pressure fluid at an angle outwardly from the axis of rotation and in separate streams onto an exterior surface of a vehicle. The plurality of wash media elements are disposed on the backing member such that they surround the plurality of spray nozzles and allow the separate fluid streams to pass between adjacent wash media elements substantially unobstructed.

BRIEF DESCRIPTION OF THE DRAWINGS

Other aspects of the present disclosure will be readily appreciated, as the same becomes better understood by reference to the following detailed description when considered in connection with the accompanying drawings wherein:

FIG. 13 is a side view of a vehicle treatment brush assembly in a first position as a part of a vehicle wash system in accordance with another aspect of the disclosure.

DETAILED DESCRIPTION OF THE INVENTION

Figure 1:
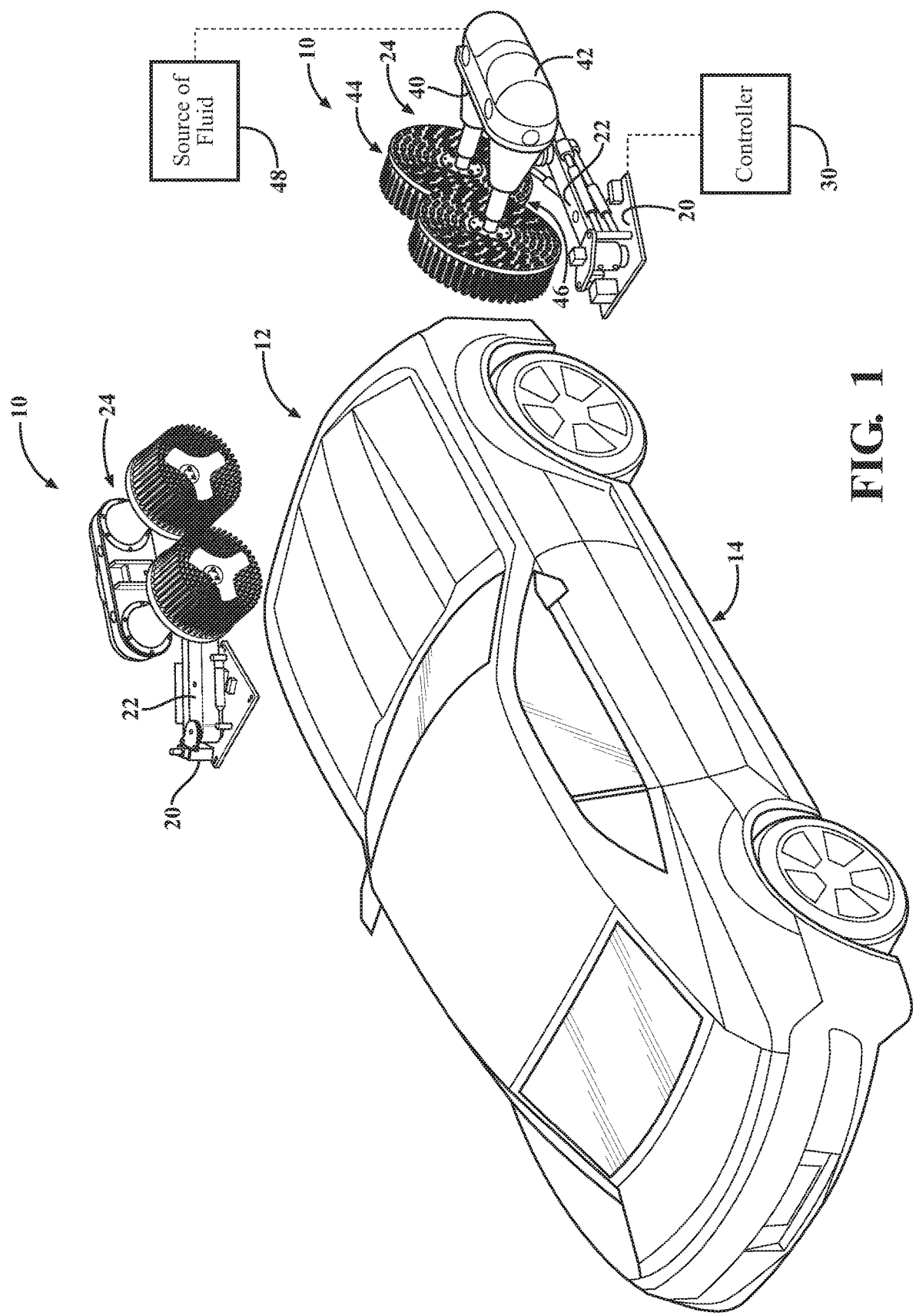
FIG. 1 is a schematic illustration of a vehicle approaching a pair of vehicle treatment brush assemblies disposed adjacent a vehicle treatment area according to an aspect of the disclosure.

Referring to the FIGS. which illustrate a vehicle treatment brush assembly 10 according to an aspect of the present disclosure. The vehicle treatment brush assembly 10 may be utilized as part of a vehicle wash system. The vehicle wash system may be configured as a tunnel car wash, where a vehicle is conveyed through the wash process by a conveyor or the like as is known in the art. Alternatively, the vehicle wash system may be configured as a roll-over type where the vehicle remains stationary and the various treatment components are translated and moved with respect to the vehicle to perform the vehicle wash process. Other suitable wash processes and systems may also be employed as are known. It will be appreciated that the disclosed treatment brush assembly could also be employed in connection with a variety of other applications outside of a vehicle wash system, such as a manual or self-serve wash process or in applications unrelated to the wash industry.

According to an aspect, the vehicle wash system may be housed within a vehicle wash facility having an entrance end where a vehicle enters, an exit end where the vehicle leaves, and a vehicle treatment area 12 therebetween. According to an aspect, the system can include a plurality of other treatment components disposed adjacent the vehicle treatment area 12 for engaging and/or treating an exterior surface of the vehicle as it passes through the vehicle wash system. For example, the treatment components can include a rinse arch, which sprays water onto a vehicle and/or a bubble device that generates bubbles and emits them directly onto a vehicle exterior. Other components may include one or more top brushes for contacting a top exterior surface of a vehicle, a plurality of side brushes for contacting side exterior vehicle surfaces, and a plurality of wrap brushes for contacting front and back surfaces of a vehicle. Another component may include wheel scrubbers for engaging vehicle wheels. Drying components for removing excess water from the vehicle exterior can also be employed. According to a further aspect, the system can include a wheel polishing device for treating vehicle wheels. It will be appreciated that more, less or different wash components may be employed. Additionally, multiples of the same components may be employed as part of a wash system as desired. Further, the components may take on a variety of different configurations. Moreover, the order, placement and sequence of the components within the system may also vary.

According to an aspect, the present disclosure relates to a rotary brush assembly for treating an exterior painted surface of a vehicle, such as compound or complex surfaces. The assembly is also well suited for treating vehicle wheels. With reference generally to the FIGS., the vehicle brush assembly 10 may be disposed adjacent the vehicle treatment area 12 to engage lower portions of a vehicle 14. According to an aspect, the brush assembly 10 may be configured to engage exterior vehicle surfaces that may be known to be difficult to clean, including wheels and rocker panels. However, it will be appreciated that the vehicle brush assembly 10 may be configured to engage a variety of other vehicle surfaces as desired.

According to an aspect and with specific reference to FIGS. 1 and 6 through 12, the brush assembly 10 may include a base portion 20, a linkage arm portion 22, and a treatment portion 24. According to an aspect, the base portion 20 may be configured to engage a floor or other surface in a vehicle wash facility to support the assembly 10. The base portion 20 may be constructed of a metal material such as steel or aluminum and may be powder coated, painted or otherwise shielded from corrosion. The base portion 20 may alternatively be constructed of a variety of other suitable materials. The base portion 20 may be rectangular-shaped and bolted or otherwise secured to the floor to keep the assembly 10 firmly in place for proper treatment of a vehicle. It will be appreciated that the base portion 20 may be secured to a variety of different surfaces within the vehicle wash facility, in a variety of suitable ways and may have a variety of other shapes.

According to an aspect, the linkage arm portion 22 may have a first end 26 that pivotally engages the base portion 20. The linkage arm portion 22 may include a second end 28 that pivotally engages the treatment portion 24. According to an aspect, the assembly 10 may be in communication with a controller 30, which can effectuate control there over to direct its movement and operation. According to an aspect, the controller 30 can direct movement of the linkage arm portion 22 in order to extend the treatment portion 24 toward a first position where it engages the vehicle treatment are 12 and can communicate with a vehicle 14. The controller 30 can also retract the treatment portion 24 toward a second position disposed away from the vehicle treatment area 12 to prevent engagement with a vehicle 14. It will be appreciated that the controller 30 may be configured to control other components and features within the vehicle wash system. According to a further aspect, the treatment portion 24 may be secured to the second end 28 of the linkage arm portion such that it is biased at an angle with respect to the direction of travel of the vehicle, as discussed in more detail herein.

According to an aspect, the linkage arm portion 22 may include a rail portion 32 that extends between the first end 26 and the second end 28. The linkage arm portion 22 can also include a pair of cylinders 34 disposed on and connected to either side of the rail portion 32. The cylinders 34 may be in communication with the controller 30 to effectuate pivotal movement of the rail portion 32 so as to move the treatment portion 24 toward and away from the vehicle treatment area 12 generally between the first position and the second position. According to a further aspect, the cylinders 34 may be configured to bias the treatment portion 24 toward the vehicle treatment area 12 in order to maintain pressure on the vehicle 12 in the first positon. According to an aspect, the treatment portion 24 may be pivotally attached to the rail portion 32 by at least one swivel mount 36. It will be appreciated that multiple swivel mounts may alternatively be employed. Additionally, a variety of other suitable attachment methods/mechanism may be employed. The linkage arm portion 22 may be formed of steel, aluminum, plastic or a variety of other suitable materials.

According to an aspect, the treatment portion 24 can include a back plate portion 40, a cover portion 42, a first brush assembly 44, and a second brush assembly 46. According to an aspect, the first brush assembly 44 and the second brush assembly 46 may have the same components and thus the description of one of the assemblies will apply equally to the other. According to a further aspect, there are some differences in the brush assemblies that will be identified and described herein. According to an aspect, the first brush assembly 44 and the second brush assembly 46 may be individually supported on the back plate portion 40 such that they are oriented generally parallel to the ground.

Additionally, the treatment portion 24 may be in communication with a source of fluid 48. According to an aspect, the source of fluid 48 may be in communication with a high pressure inlet 50 associated with the assembly 10 by way of various fluid lines so that fluid may be delivered to the assembly 10. Fluid that enters the high pressure inlet 50 may be in communication with high pressure fluid lines 52, 54, 56 so that fluid may be delivered to a fluid inlet 58 of the first brush assembly 44 and a fluid inlet 60 of the second brush assembly 46. According to an aspect, the source of fluid 48 can be water or a combination of soap and water. It will be appreciated that a variety of other suitable fluids, including suitable chemicals may alternatively be employed.

With reference to FIGS. 8 through 12, the first brush assembly 44 can include a brush portion 70, a nozzle adapter 72, a shaft portion 74, and a motor portion 76. According to an aspect, the motor portion 76 may be in communication with the shaft portion 74 to effectuate rotation of the brush portion 70, as discussed in more detail herein. According to an aspect, the motor portion 76 may be a gear motor. It will be appreciated, however, that a variety of other suitable motor types or drive mechanism may be employed. According to a further aspect, the motor portion 74 may be secured to an outboard side 78 of the back plate portion 40. The motor portion 74 may be secured to the black plate portion 40 by an attachment mount 60. According to an aspect, the first brush assembly 44 and the second brush assembly 46 may be directed to rotate in opposite directions to provide improved cleaning capabilities. It will also be appreciated that more or less brush assemblies may be employed. According to a still further aspect, the brush portion 70 may be of a non-rotating type that is in communication with a movement mechanism to move the brush portion 70 laterally with respect to a surface of a vehicle.

Figure 8:
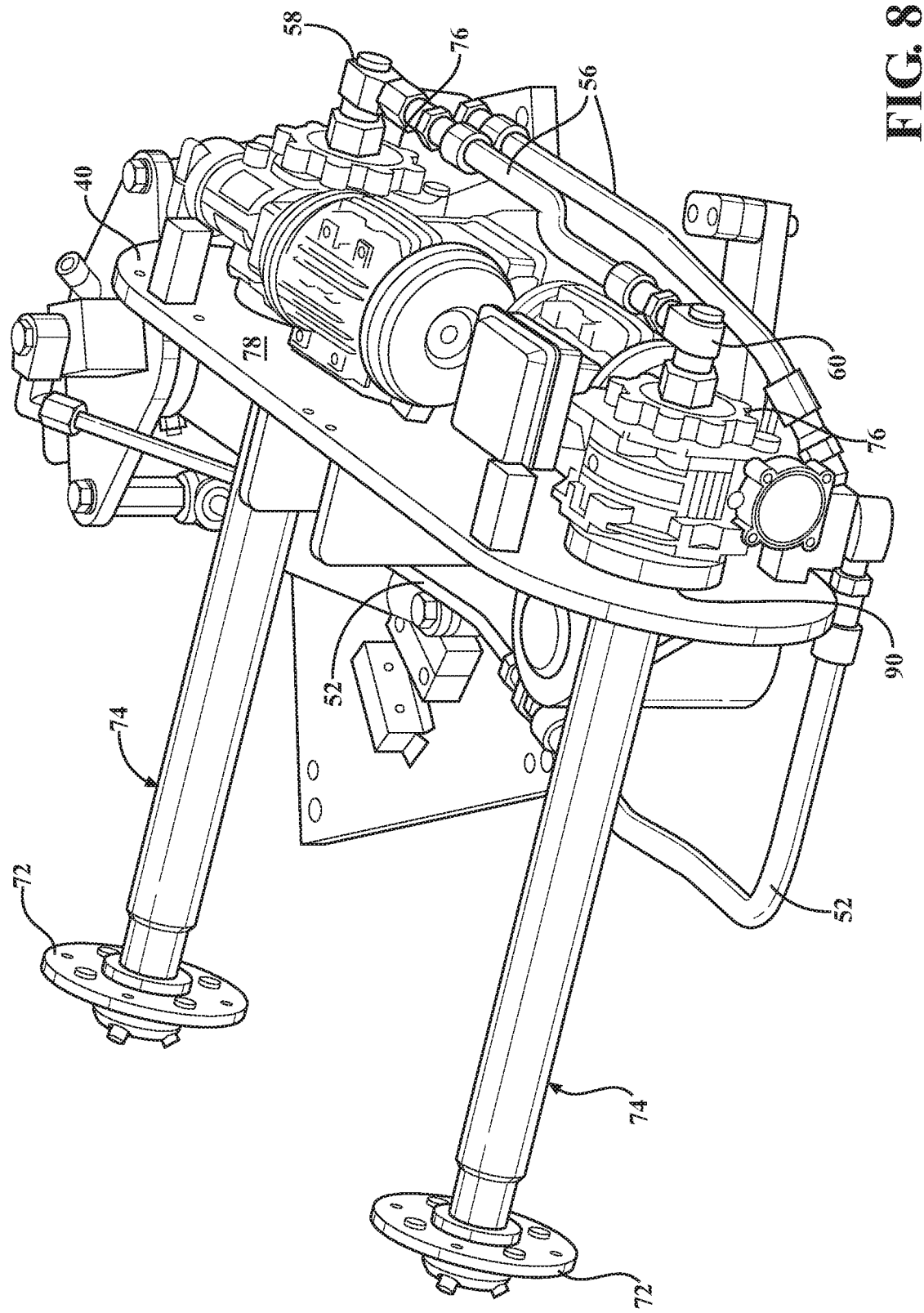
FIG. 8 is a broken away view illustrating the inner workings of a vehicle treatment brush assembly according to an aspect of the disclosure.
Figure 9:
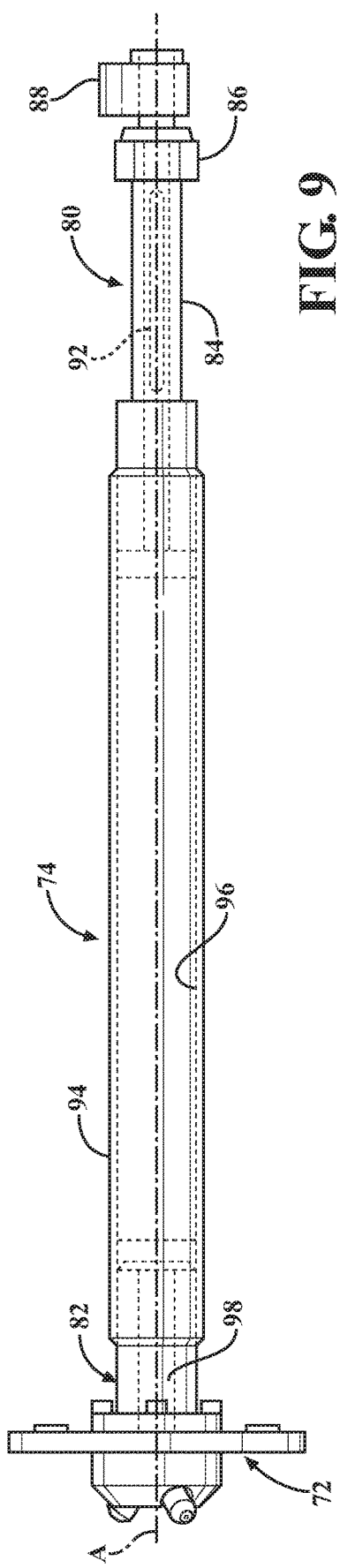
FIG. 9 is a schematic illustration of a shaft assembly for a vehicle treatment brush assembly according to an aspect of the disclosure.

With reference to FIGS. 8 and 9, the shaft portion 74 may include a first end portion 80 and a second end portion 82. According to an aspect, the first end portion 80 can include a keyway portion 84 for being received within and engaging the motor portion 76 to effectuate rotation of the shaft portion 74 around an axis of rotation A. The first end portion 80 can also include a securing mechanism 86 for securing the shaft portion 74 to the motor portion 76 to maintain engagement thereof. According to a further aspect, the first end portion 80 can also include a swivel connection 88 with the fluid line 56 to allow for delivery of fluid to the fluid inlet 58 while the shaft portion 74 rotates. A variety of other suitable connectors between the shaft portion 74 and the fluid line 56 may also be employed. According to an aspect, the first end portion 80 may pass through an opening 90 in the back plate portion 40 for engagement with the motor portion 76.

According to an aspect, the keyway portion 84 can include an interior passageway 92 for conveying fluid from the fluid inlet 58 to the brush portion 70. According to a further aspect, the shaft portion 74 can include a hollow sleeve portion 94 disposed around an inner rotating portion 96. The hollow sleeve portion 94 may be in communication with the interior passageway 92 such that the high pressure fluid can be conveyed to the second end portion 82 of the shaft portion 74. The second end portion 82 can also include a fluid passage 98 that is in communication with the nozzle adapter 72, which may be secured to the second end portion 82 of the shaft portion 74 to allow fluid to be conveyed therethrough. It will be appreciated that the nozzle adapter 72 may be secured to the shaft portion 74 in a variety of suitable ways.

Figure 10:
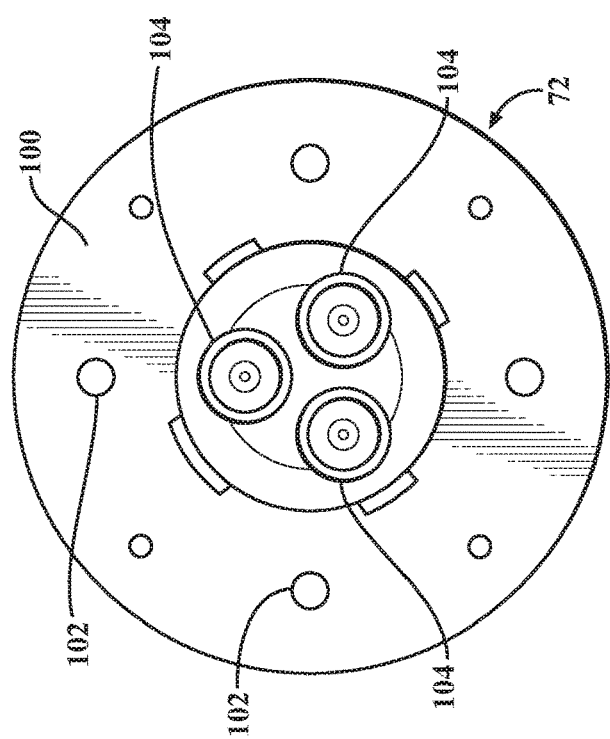
FIG. 10 is a front view of nozzle adaptor for attachment to a shaft assembly of a vehicle treatment brush assembly according to an aspect of the disclosure.
Figure 12:
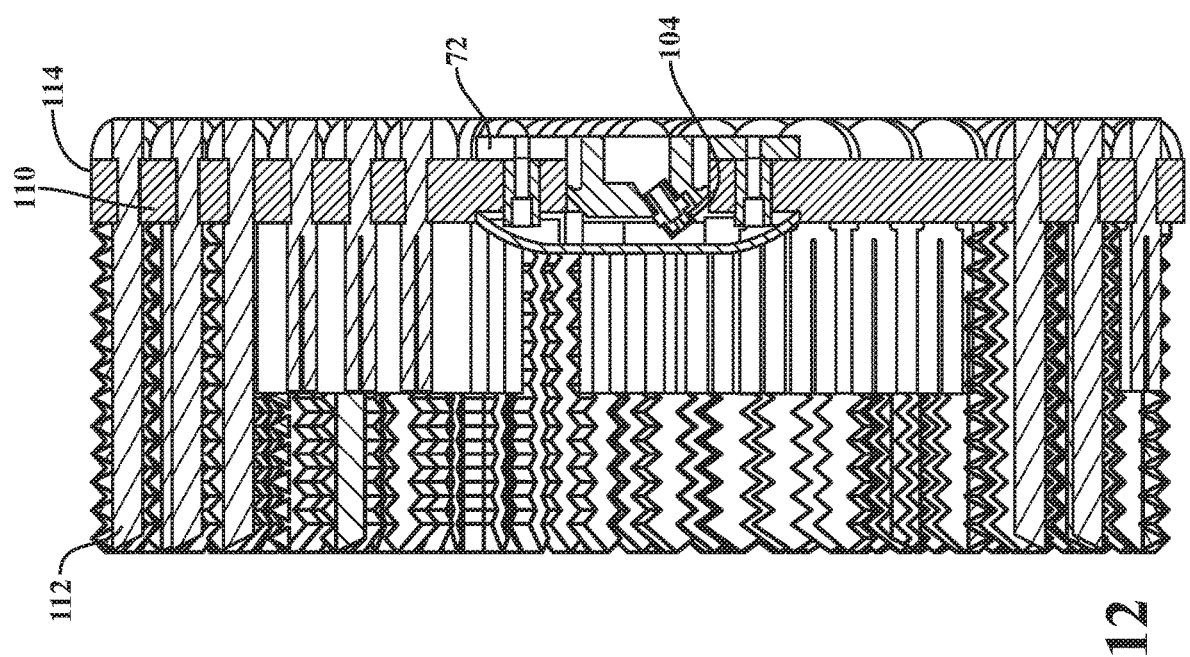
FIG. 12 is a cross-sectional view of the flexible wash media assembly of FIG. 11 along the line A-A.
Figure 11:
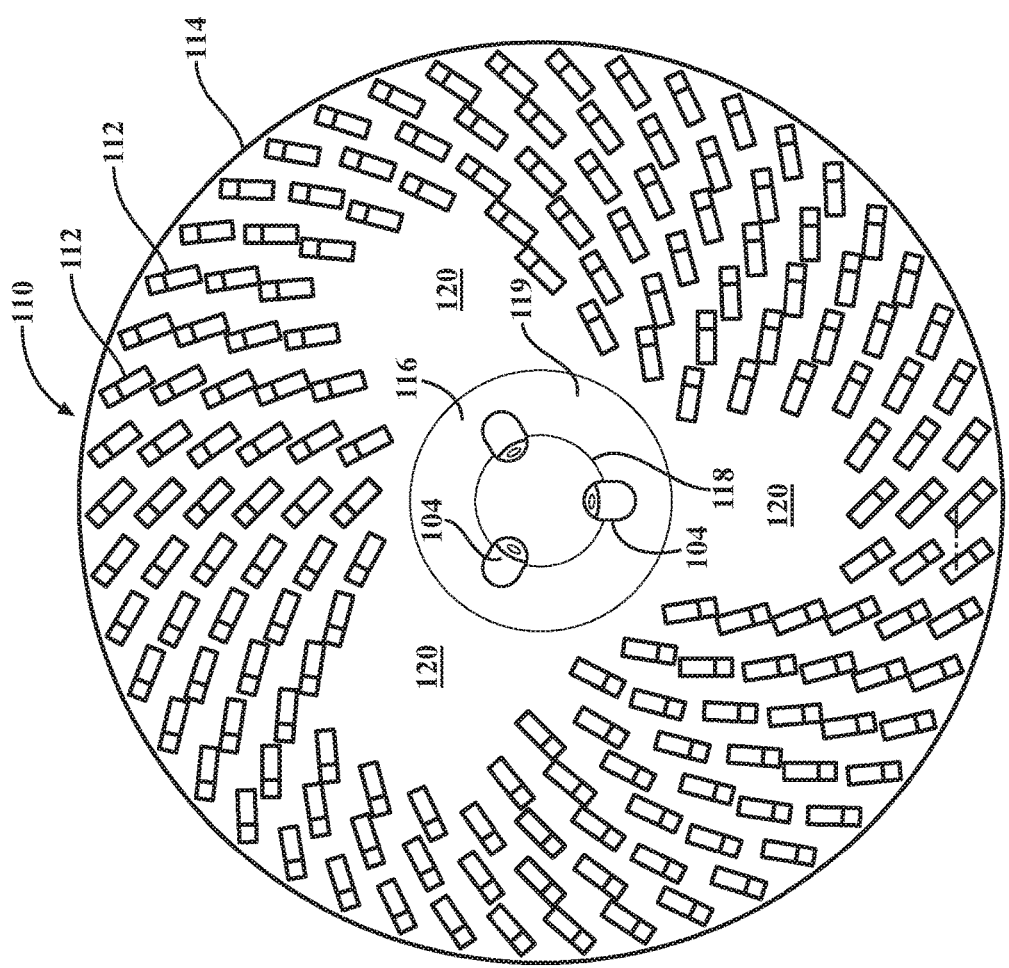
FIG. 11 is a front view of a flexible wash media assembly for a vehicle treatment brush assembly according to an aspect of the disclosure.

According to an aspect and as best shown in FIG. 10, the nozzle adapter 72 can be configured as a generally circular plate with a plurality of mounting holes 102 to allow attachment of the brush portion 70 thereto. According to a further aspect, the nozzle adapter 72 can include a plurality of high pressure spray nozzles 104 that are in communication with the fluid passage 98 so as to receive fluid from the fluid source 48. As shown, three high pressure spray nozzles may be employed. However, more or less spray nozzles may be employed as desired. According to an aspect, the spray nozzles 104 may be angled outwardly such that fluid may be emitted at an outward angle or away from the axis of rotation A. The angle at which the spray nozzles 104 are oriented may vary. The spray nozzles 104 may be configured to emit a stream of fluid on an arc as shown With reference to FIGS. 6 and 7, the brush portion 70 may be disposed at the second end 82 of the shaft portion 74. According to an aspect, the brush portion 70 may include a backing member 110 and a plurality of wash media elements 112 secured to the backing member 110. The backing member 110 may be secured to a front face 100 of the nozzle adapter 72 by securing it to the mounting holes 102 via a plurality of fasteners such that the backing member 110 can rotate as the shaft portion 74 rotates. It will be appreciated that a variety of suitable fasteners may be employed. It will also be appreciated that any number of mounting holes may also be employed.

According to an aspect, the backing member 110 may be formed of a soft flexible or pliable material such that it can move or flex to accommodate different vehicle contours or features during operation, such as corners, curves, tight areas and/or other complex surfaces. According to an aspect, the flexibility of the backing member 110 can provide significantly improved cleaning of a vehicle exterior during a vehicle wash process by providing more consistent contact between the wash media elements 112 and the vehicle exterior. According to another aspect, the backing member 110 can be formed of a material that has memory. In other words, the backing member 110 can be formed of a material that can move from a starting position, but has memory to return to its original position after it has been displaced. According to an aspect, as some wash media elements 112 flex to accommodate vehicle surface contours, a portion of the backing member 110 may flex outwardly (away from the vehicle treatment area) with respect to a reference plane defined by the backing member 110, while the reminder of the backing member 110 may still reside in the plane such that other wash media elements 112 still may contact a vehicle. The displaced portion can then return to the plane. According to one aspect, the backing member 110 may be formed of ethylene vinyl acetate ("EVA") material. It will be appreciated that the backing member 110 can be formed of a variety of other suitable materials, including polyethylene foam. According to a still further aspect, the backing member 110 may be formed from a variety of suitable processes, including vacuum forming.

As shown, the backing member 110 may be configured in the shape of a generally circular disk and may have a generally planar configuration. However, the backing member 110 may have a variety of different shapes and may have other orientations, such as curved or non-planar. According to one aspect, the backing member 110 may have a generally convex shape such that the outer periphery 114 of the backing member 110 is disposed further away from the vehicle treatment area than a middle portion 116 of the backing member 110. According to another aspect, the backing member 110 could have a concave shape. According to another example, the backing member 110 may be configured with spaced apart spokes like a wagon wheel with a discontinuous outer periphery. Additionally, the backing member 110 may have a variety of different sizes and thicknesses.

According to another aspect, the plurality of media elements 112 may be secured to the backing member 110 such that they rotate therewith. As shown, according to one aspect, the backing member 110 may have a plurality of openings formed therein (not shown) such that each of the media elements 112 may be threaded or woven through a respective one of the plurality of openings to secure it to the backing member 110. According to an aspect, the media elements 112 each extend outward from the backing member 110. The media elements may be configured and attached to the backing member 110 as shown and disclosed specifically in Applicant's co-pending application Ser. No. 14/327,744, which is hereby incorporated by reference herein. It will be appreciated that the plurality of media elements 112 could be secured to the backing member 110 in a variety of different ways.

According to a further aspect, the media elements 112 may be configured such that they are substantially self-supporting along their length and remain oriented substantially perpendicular to the backing member 110 during operation. In other words, according to an aspect, the media elements 112 may be constructed so as to retain their shape during rest and operation such that they do not sag or droop. According to this aspect, because the media elements 112 are self-supporting, they can exert a consistent pressure on the vehicle surface and make contact at more or less predetermined locations, regardless of the brush's rotational speed. This can provide more effective cleaning of the vehicle exterior. According to an aspect, the media elements 112 may be formed of a non-marring material that will not damage a painted exterior surface, such as a foam material, including an EVA. However, it will be appreciated that a variety of other suitable materials may be employed to form the media elements that will not scratch, mar or otherwise damage a painted surface of a vehicle. For example, instead of foam, a synthetic material may be employed such as is employed with plastic bristles. One of ordinary skill will understand that the media elements alternatively may be configured as bristles. According to an aspect as shown, the backing member 110 may be secured to the front face 100 of the nozzle adapter 72 such that the spray nozzles 104 are fully exposed. This can be accomplished by having a central opening 118 formed in backing member 110. Alternatively, the backing member 110 may include a protector 119 adjacent the central opening 118 that may be disposed over at least a portion of the spray nozzles 104 to provide protection therefore.

According to another aspect, the wash media elements 112 may be secured to the backing member 110 such that they encircle or surround the plurality of nozzles 104. According to another aspect, the wash media elements 112 may be secured to the backing member 110 in a pattern such that one or more pockets 120 may be formed amongst the wash media elements 112, but exit the pocket and contact a vehicle exterior. As shown, the pockets 120 may be areas of the backing member 110 that do not have wash media elements 112 attached. According to an aspect, the pockets 120 may be disposed in areas of the backing member 110 between adjacent wash media elements 112 and corresponding to the direction of angle of the spray nozzles 104. As will be appreciated, the absence of the wash media elements 112 in the pockets 120 can allow high pressure fluid to be emitted from the nozzles 104 away from the axis of rotation A at an angle without contacting surrounding wash media elements 112. By this configuration, a wider spray of high velocity fluid resulting from three separate high pressure streams 122, 124, 126 may be achieved. According to an aspect, the angle at which the spray nozzles 104 can direct fluid may vary. It will be appreciated that the spray nozzles 104 may be angled to direct fluid in a spray pattern to direct fluid onto the spokes of the wheel. According to an aspect, the size of the pockets 120 can vary depending upon the direction of the spray nozzles 104. According to another aspect, the nozzles 104 may be configured such that they are angled to direct fluid outwardly away from the axis of rotation or centerline $C_L$ and toward the outer periphery 114 of the backing member 110.

According to an aspect, the plurality of pockets 120 are fully bounded by wash media elements 112. This configuration can ensure that when the wash media elements 112 engage an exterior of the vehicle, the fluid emitted from the plurality of spray nozzles 104 will remain within the envelope of the plurality of pockets 120 between the wash media elements 112 and the vehicle exterior. By this configuration, the fluid emitted from the plurality of spray nozzles 104 is self-contained within the pockets 120 and will minimize the amount of fluid that travels to unwanted places within the vehicle wash facility. According to a further aspect, the wash media elements 112 can by utilized to set the depth of the spray nozzles 104 from the surface which they are intended to clean. According to an aspect, this can ensure that the nozzles 104 can be close enough to the vehicle surface to direct a high pressure fluid for cleaning purposes, but also ensures that the nozzles 104 do cannot contact the vehicle surface, which can cause significant damage to the vehicle.

According to an aspect, the brush assembly 10 can provide multi-directional cleaning on a vehicle exterior. Multi-directional cleaning allows the media elements 112 of the brush assembly 10 to engage a vehicle surface in multiple different directions to provide more effective cleaning capabilities in order to remove more dirt and debris from an exterior vehicle surface as compared to a brush yielding only single direction cleaning. According to an aspect, as the backing member 110 rotates in a clockwise direction, the media elements 112 on a rearward half of the brush assembly 10 can engage the vehicle exterior in a downward direction. At the same time, the media elements 112 on a forward half of the brush assembly 10 can engage the vehicle exterior in an upward direction. Thus, as the brush assembly 10 travels along the vehicle surface (due to movement of the brush assembly 10 with respect to the vehicle or movement of the vehicle with respect to the brush assembly 10) the same portion of the vehicle exterior can be subject to cleaning in both an upward and downward direction to provide more effective cleaning.

With reference to FIGS. 1 through 5, an operation of the disclosed assembly in accordance with an aspect is discussed. As shown, a rotary brush assembly 10 may be disclosed on either side of the vehicle treatment area 12. According to an aspect, the rotary brush assembly 10 on one side of the vehicle treatment area 12 may contact one side of the vehicle 14 while the rotary brush assembly 10 on the other side of the vehicle treatment area 12 may contact the other side of the vehicle 14.

According to an aspect as shown in FIG. 1, each of the assemblies 10 is disposed in a second position where they extend into the vehicle treatment area 12, for engaging a vehicle. As discussed above, the assemblies 10 can be moved to a second position disposed away from the vehicle treatment area 14 and away from a car engaging position. According to an aspect, the controller 30 can direct that the assemblies be moved to the first position due to the sensed approach of the vehicle 14. It will be appreciated that the controller 30 can be in communication with a variety of sensors to receive inputs regarding the location of the vehicle to control the location of the assemblies 10 as well as other components that are part of the wash system. As shown, according to an aspect, the location of the vehicle 14 has not caused the controller 30 to begin rotation of the assemblies or to allow fluid to be emitted from the spray nozzles 104. It will be appreciated that the flow of fluid through the spray nozzles 104 can be controlled by a series of valves.

According to another aspect, the treatment portion 24 may be angled (pivoted about a vertical axis) such that the first brush assembly 44 is disposed closer to the vehicle treatment area 12 than the second brush assembly 46. In other words, the treatment portion 24 may be biased to an angle with respect to the vehicle treatment area 12. By this configuration, a plane defined by the brush backing members 110 may be oriented at an angle with respect to the vehicle treatment area 12 and thus the exterior surface of the vehicle. It will be appreciated that the angle at which the treatment portion 24 can be biased may vary. According to one aspect, the angle of bias or pivot may be between 20 and 40 degrees with respect to the vehicle treatment area 12. This configuration can also allow the rotary brush assemblies 10 to provide a high pressure fluid spray onto the front vehicle surface as the vehicle 12 is approaching. While the treatment portion 24 can be biased to a particular angle, the angle can change when it engages a vehicle surface.

Figure 2:
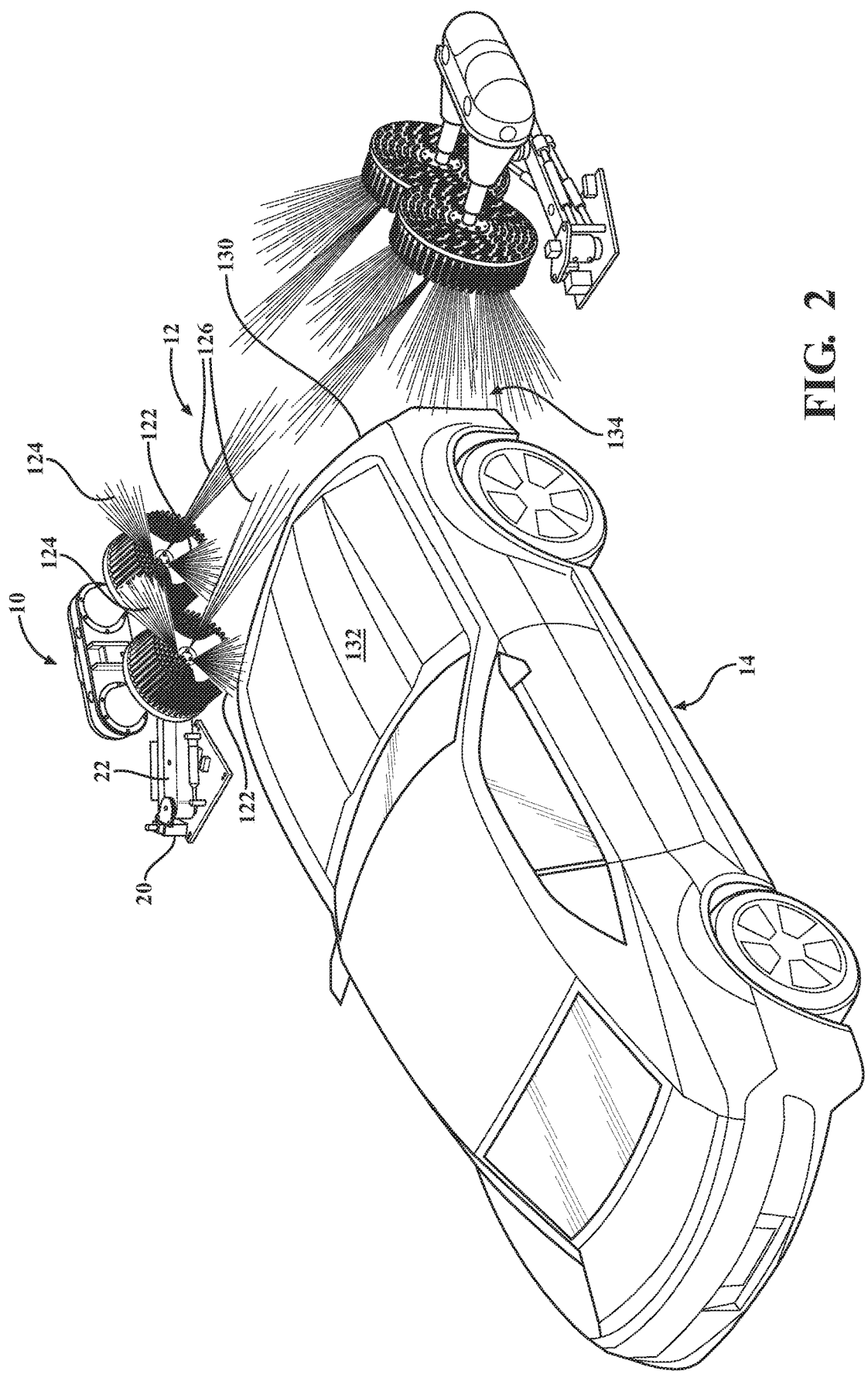
FIG. 2 is a schematic illustration of the pair of vehicle treatment brush assemblies of FIG. 1 spraying water onto a front end of the vehicle as it enters their treatment area according to an aspect of the disclosure.

According to an aspect shown in FIG. 2, the controller 30 has sensed the approach of the vehicle 14 and turned on the spray nozzles 104. According to an aspect, the controller 30 can also signal the motor portions 76 in order to effectuate rotation of the first brush portion 44 and the second brush assembly 46 about an axis of rotation at the same time the nozzles 104 are turned on. As the vehicle approaches, each of the brush assemblies 10, the high pressure streams 122, 124, 126 can engage the front portion 130, hood 132, and side portions 124 of the vehicle 14 because of the angle at which the treatment portion 24 is angled.

Figure 3:
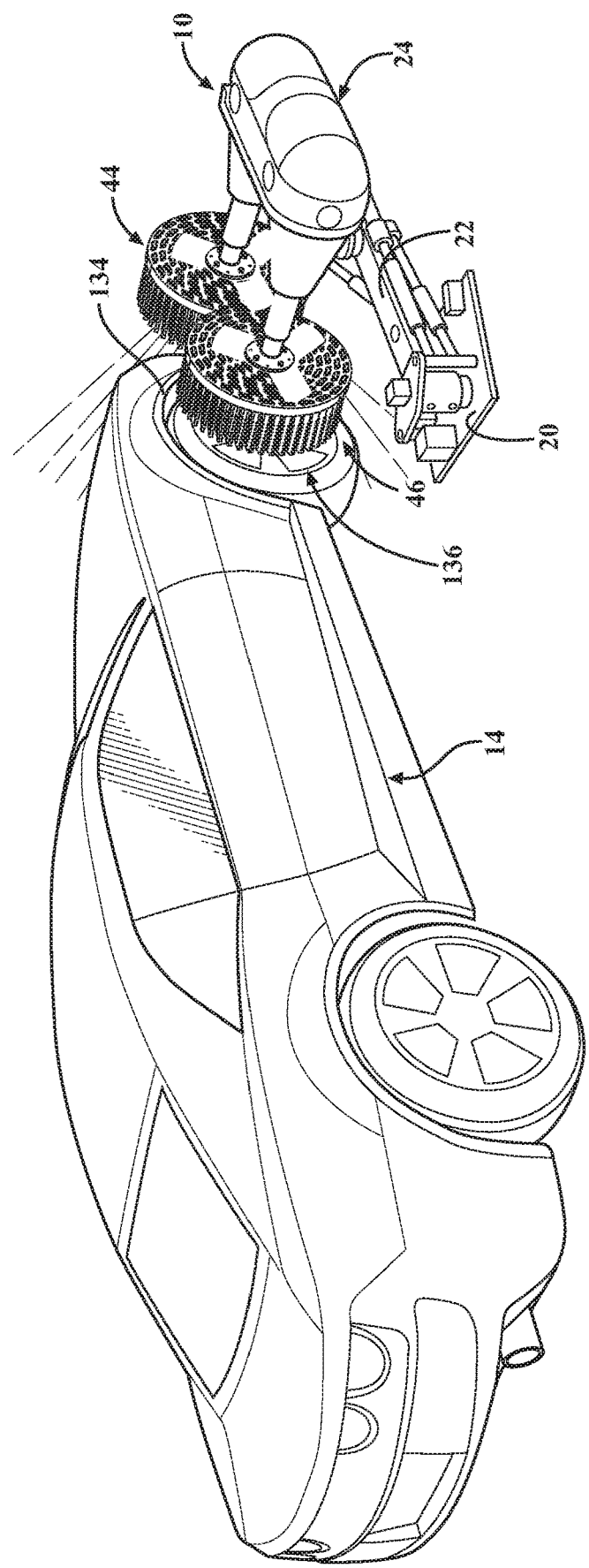
FIG. 3 is a schematic illustration of the pair of vehicle treatment brush assemblies of FIG. 1 engaging and treating front side portions of the vehicle according to an aspect of the disclosure.

As shown in FIG. 3, as the vehicle 14 continues to travel forward through the vehicle treatment area 12, the second brush assembly 46 and its wash media elements 112 contact the exterior surface of the vehicle 14 as well as the vehicle wheel 136. According to an aspect, the high pressure streams 122, 124, 126 emitted from the second brush assembly 46 may be directed on the front side portions 130 of the vehicle 14 and the vehicle wheels 136. As shown, in this configuration, the first brush assembly 44 may not be contacting the vehicle 14 and the high pressure streams 122, 124, 126 may be emitting fluid in a wider spray pattern, including onto the front portion 130. As shown, when the second brush assembly 46 engages the vehicle 14, the treatment portion 24 can pivot or rotate away from its biased starting position to an orientation where it is oriented generally parallel to a vehicle exterior.

Figure 4:
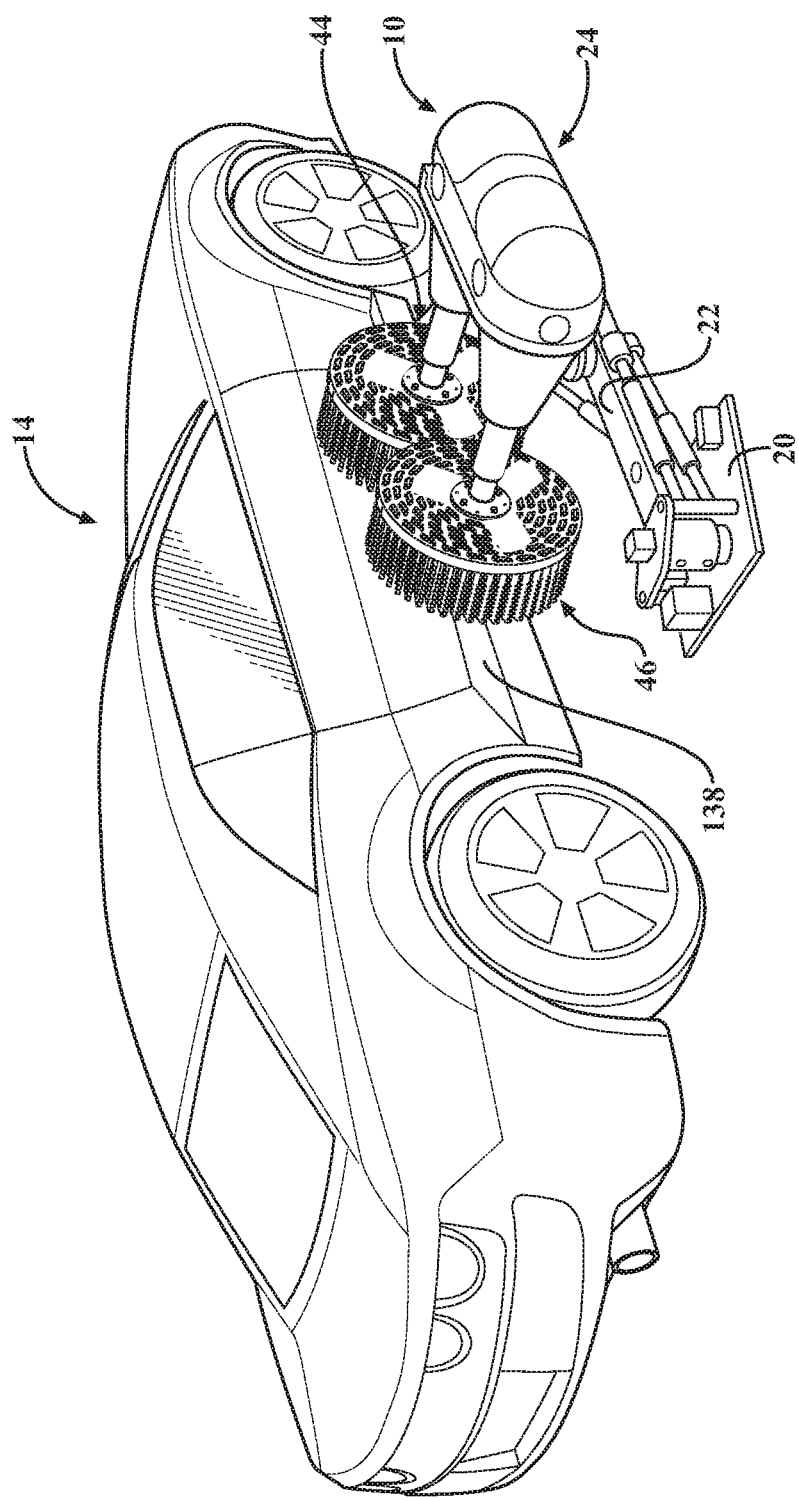
FIG. 4 is a schematic illustration of the pair of vehicle treatment brush assemblies of FIG. 1 engaging and treating opposing side surfaces of the vehicle according to an aspect of the disclosure.

With reference to FIG. 4, as the vehicle 14 has continued to move forward through the vehicle treatment area 12, both the first brush assembly 44 and the second brush assembly 46 may be in engagement with the rocker panel of the vehicle 14. In this configuration, the first and second brush assemblies 44, 46 may be rotating and the wash media elements 112 of each brush assembly 44, 46 can directly contact the side portions 138 of vehicle exterior. Additionally, the high pressure streams 122, 124, 126 are being directed onto the vehicle exterior at close range. The high application of high pressure fluid to the vehicle can assist with removing dirt, particularly dirt that is known to be tough to remove in prior wash systems, including on wheels and lower portions of a vehicle exterior, such as rocker panels.

Figure 5:
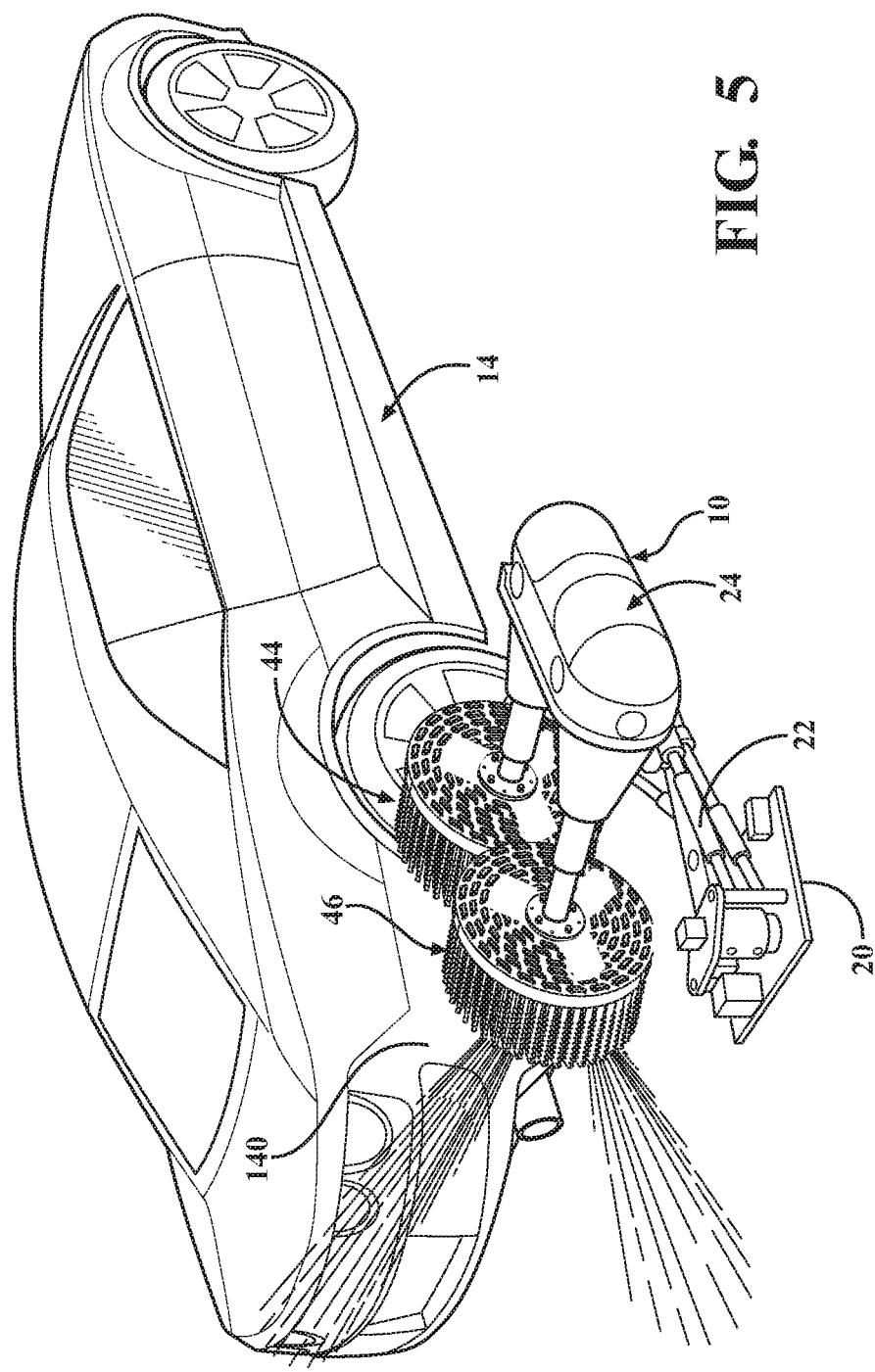
FIG. 5 is a schematic illustration of the pair of vehicle treatment brush assemblies of FIG. 1 engaging and treating opposing rear surfaces of the vehicle according to an aspect of the disclosure.
Figure 6:
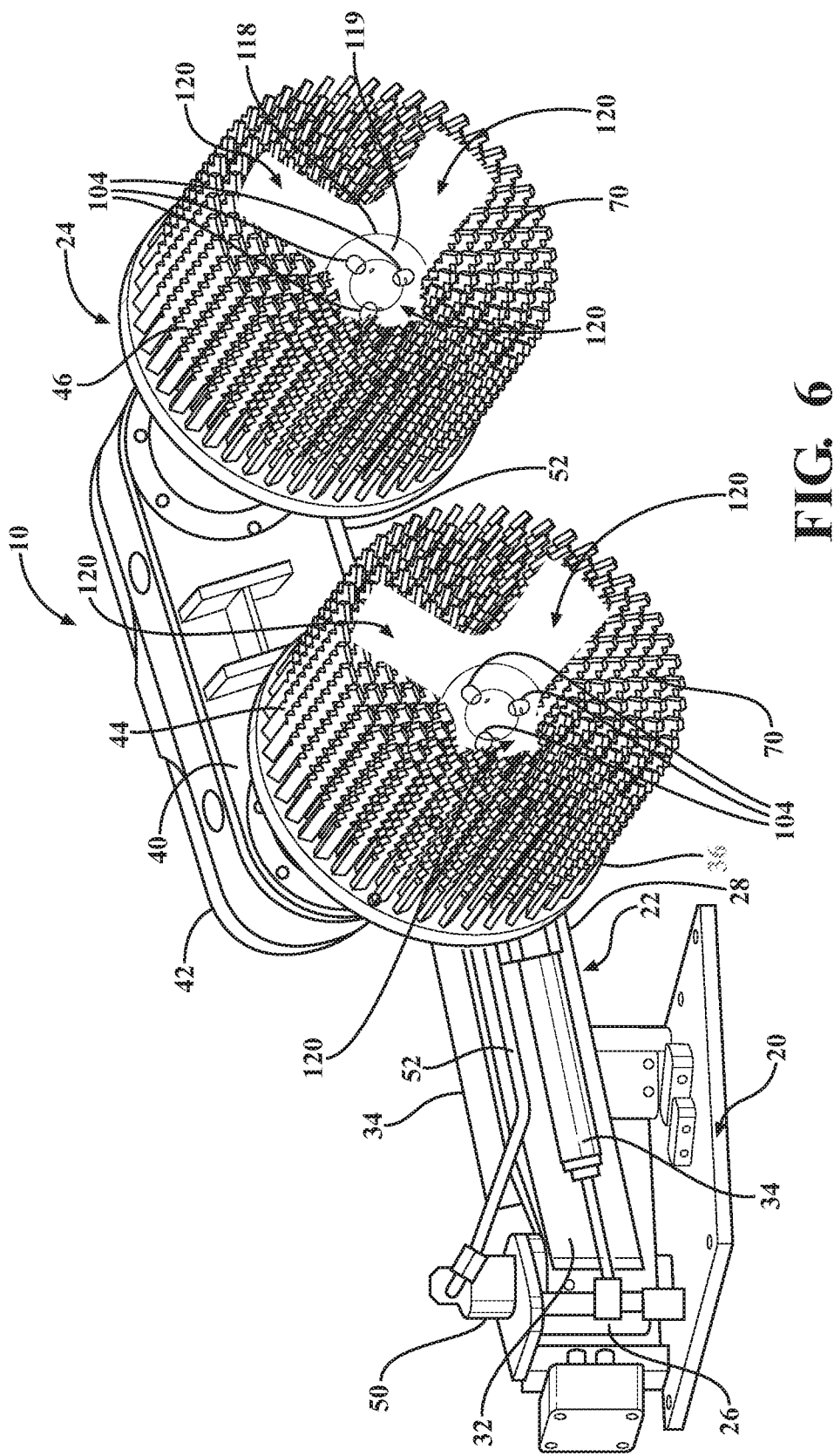
FIG. 6 is a perspective view of a vehicle treatment brush assembly for a vehicle wash system according to an aspect of the disclosure.
Figure 7:
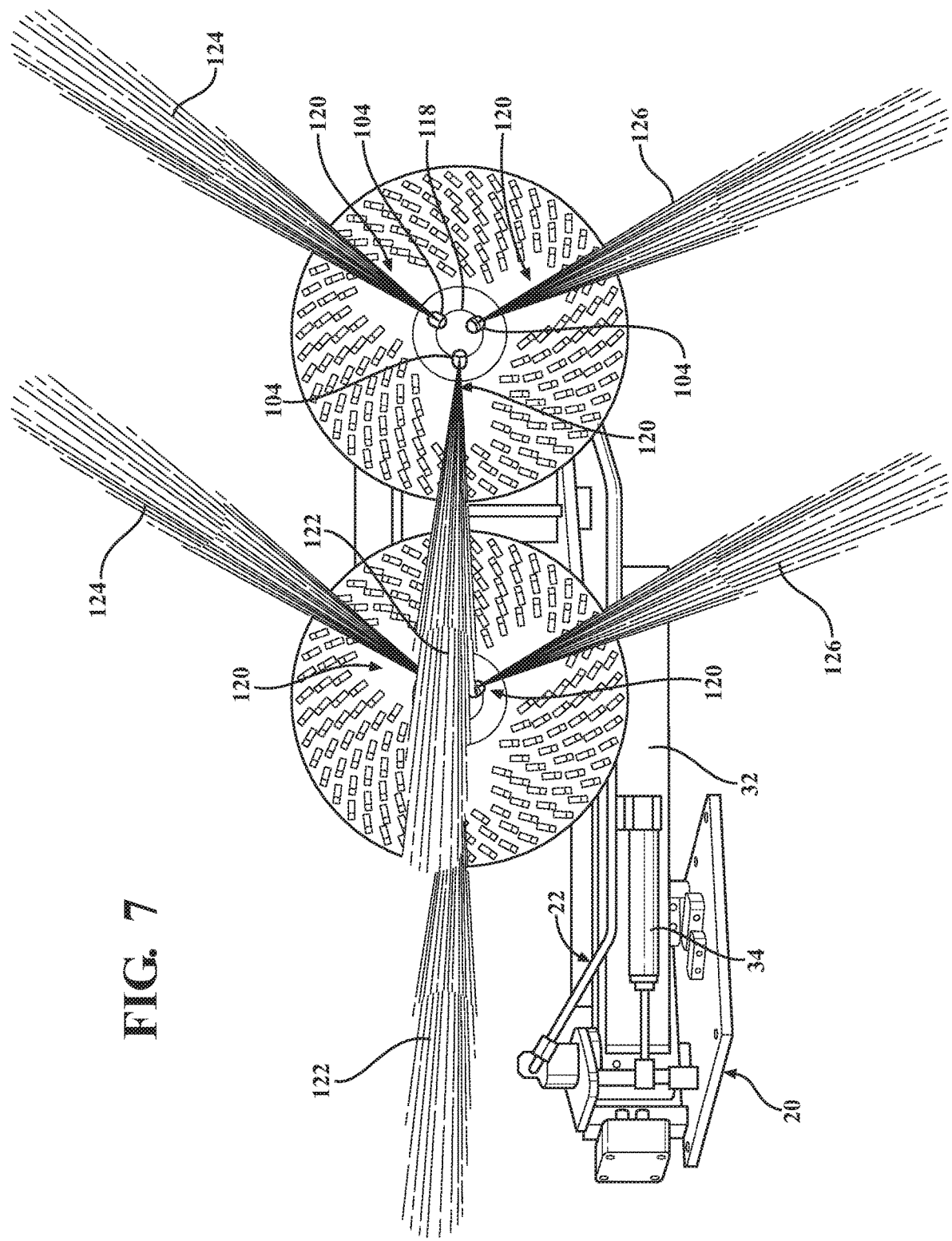
FIG. 7 is a front view of a vehicle treatment brush assembly emitting a plurality of streams of high velocity water according to an aspect of the disclosure.

According to an aspect and as exemplarily shown in FIG. 5, as the vehicle 14 has continued forward through the vehicle treatment area 12, both the first brush assembly 44 and the second brush assembly 46 may be disposed near the rear portion of the vehicle 14 and are treating the rear lower portion 140. As shown, in this position, the second brush assembly 46 may only be in partial engagement with the exterior surface of the vehicle 14. As shown, the first brush assembly 44 may still be in contact with the vehicle exterior to continue the cleaning process. Once the vehicle 14 has cleared the assemblies 10, they can pivot back to their normal biased position where the treatment portion 24 is oriented at an angle with respect to the vehicle treatment area 12.

Figure 14:
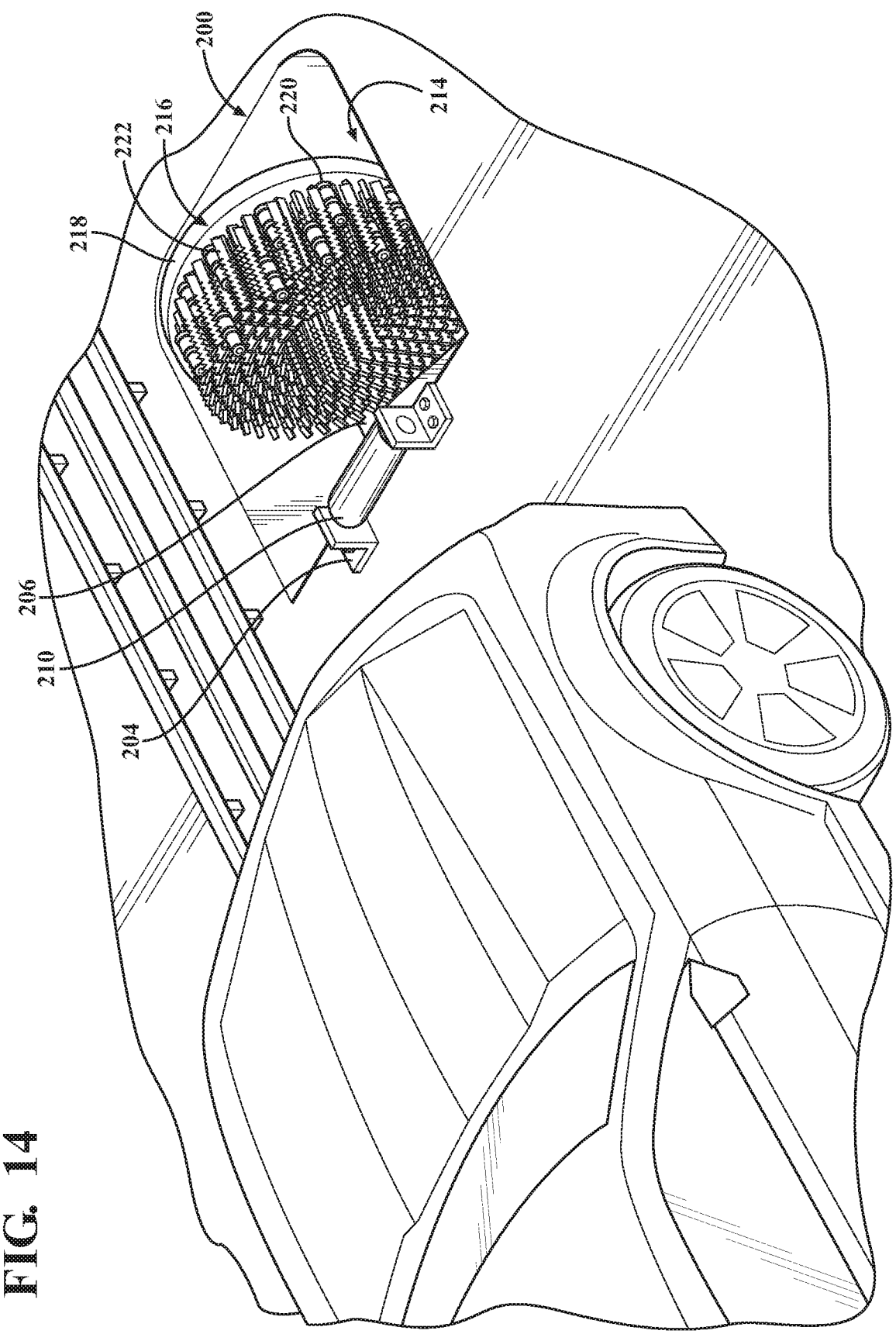
FIG. 14 is a perspective view of a vehicle treatment brush assembly in a second position as part of a vehicle wash system in accordance with another aspect of the disclosure.

Turning now to FIGS. 13 and 14, which illustrate another aspect of the present disclosure. According to an aspect, a brush assembly 200 is provided for treating an exterior painted surface of a vehicle. As shown, the brush assembly 200 may be configured to engage a front portion 202 of a vehicle, including a grill portion. As is known, it is a challenge for current vehicle wash systems to sufficiently clean vehicle grills, particularly between louvers of the grill. According to another aspect, the brush assembly 200 may also be configured to engage a rear surface of a vehicle or other surfaces.

As shown, the brush assembly 200 may include a base portion 204, a linkage arm portion 206, and a treatment portion 208. According to an aspect, the base portion 204 may be configured to engage a floor 209 or other surface in a vehicle wash facility in order to support the assembly 200. The base portion 204 may be constructed of a variety of materials, have a variety of shapes, and may be secured in a variety of ways, as discussed above. The base portion 204 may be oriented in the vehicle wash system so the treatment portion 208 can be brought into communicate with a front portion 202 of the vehicle.

According to an aspect, the linkage arm portion 202 may have a first end 210 that pivotally engages the base portion 204 and a second end 212 connected to the treatment portion 208. According to another aspect, the assembly 200 may be in communication with a controller, which can effectuate control there over to direct its movement and operation. According to an aspect, the controller can direct movement of the linkage arm portion 208 in order to pivot the treatment portion 208 toward a first position where it is oriented generally vertical for engaging a front portion 202 of the vehicle. The controller can also retract the treatment portion 208 toward a second position where it is moved into a pit 214 beneath the vehicle treatment area to prevent engagement with a vehicle 14. According to an aspect, the entire assembly 200 may be retracted and disposed in the pit 214 so that the vehicle can pass there over. According to an aspect, the movement of the assembly 200 may be accomplished by pivoting the linkage arm portion 200 with respect to the base portion 204. It will also be appreciated that the assembly 200 may be moved away from the vehicle in a variety of other suitable ways. As discussed above, it will be appreciated that the controller may be configured to control other components and features within the vehicle wash system. As shown, the linkage arm portion 206 may have a generally arcuate shape. However, it can a variety of different shapes and may be constructed of a variety of different materials.

According to an aspect, the treatment portion 208 can include a brush assembly 216 that is secured to the second end 212 of the linkage arm portion 206. The treatment portion 208 may be in communication with a source of fluid that conveys fluid to the assembly 200, which then passes through the linkage arm portion 206. The fluid can pass through a channel in the interior of the linkage arm portion 206. According to an aspect, the source of fluid can be water or a combination of soap and water. It will be appreciated that a variety of other suitable fluids, including suitable chemicals may alternatively be employed with the brush assembly 200. It will also be appreciated that more than one treatment portion may be employed as part of the brush assembly 200. According to an aspect, the multiple treatment portions may be disposed side by side or one on top of the other.

With reference to the FIGS., the brush assembly 216 can include a backing member 218, a plurality of spray nozzles 220 and a plurality of wash media elements 222. According to an aspect, the backing member 218 may be formed of a soft flexible or pliable material such that it can move or flex to accommodate different vehicle contours or features during operation, such as corners, curves, tight areas and/or other complex surfaces. According to yet another aspect, the backing member 218 may be configured, as discussed above, and may be formed of the materials and by the processes discussed above. The backing member 218 may be secured to the second end 212 of the linkage arm portion 206 in a variety of other suitable ways. According to an aspect, the backing member 218 may have an elongated configuration such that it spans the width of the vehicle and can engage the entire front surface 202 of the vehicle. According to another aspect, the backing member 218 may have a width that generally matches the width of vehicle grills. The backing member 218 may be generally rectangular in shape and may be fixedly secured to the second end 212 of the linkage arm portion 206.

According to another aspect, the plurality of media elements 222 may be secured to the backing member 218 such that they move therewith. As discussed above, the backing member 218 may have a plurality of openings formed therein (not shown) such that each of the media elements 222 may be threaded or woven through a respective one of the plurality of openings to secure it to the backing member 218. According to an aspect, the media elements 222 can ach extend outward from the backing member 218. It will be appreciated that the plurality of media elements 222 could be secured to the backing member 218 in a variety of different ways. According to a further aspect, the media elements 222 may be configured such that they are substantially self-supporting along their length and remain oriented substantially perpendicular to the backing member 218.

According to an aspect as shown, the brush assembly 200 can include a plurality of spray nozzles 220 that are in communication with the source of fluid so as to emit high pressure fluid onto the vehicle. According to another aspect, the plurality of spray nozzles 220 may be disposed on or in communication with the backing member 218 such that they are located in voids or pockets 224 between the plurality of media elements 222. Put another way, the wash media elements 222 may fully encircle the plurality of nozzles 220 such that when the wash media elements 222 engage the vehicle exterior, the fluid emitted from the plurality of nozzles 220 remains substantially enclosed within the pockets. It will be appreciated that fluid may enter the grill, but the configuration of the media elements 222 minimizes the amount of water that is thrown around the vehicle wash facility. The spray nozzles 220 may be oriented at an angle away from a centerline of the brush assembly 216. According to another aspect, the spray nozzles 220 may be oriented perpendicular to the backing member 218. Alternatively, the spray nozzles 220 may be oriented at different angles with respect to one another to direct spray at a variety of different angles. The length and rigidity of the spray nozzles 220 can serve to regulate the depth of the spray nozzles 220 so that they may be located in close proximity to the vehicle surface to be cleaned, but prevented from contacting the vehicle to avoid damage thereto.

According to a further aspect, the backing member 218 may be configured to reciprocate side to side or up and down such that the media elements 222 may reciprocate in a brush like fashion to remove dirt from vehicle surface. According to still a further aspect, the brush portion 218 can also include a shaft portion and a motor portion such that the brush portion 218 may be configured to rotate about an axis of rotation that is oriented generally perpendicular to a front surface of the vehicle.

According to an aspect, the brush assembly 200 may be directed by the controller to move to its first or upright position as shown in FIG. 13 when a vehicle is sensed to be approaching. It will be appreciated that sensors may be employed in the facility to determine a location of a vehicle within the vehicle treatment area, which sensors are in communication with the controller to provide information utilized to direct movement of the brush assembly 200. A cylinder or other biasing device may bias the brush assembly 200 toward a vehicle to assist with the cleaning process. According to another aspect, once in the first position, the controller can direct movement of the brush portion 216 and may actuate one or more valves to allow high pressure fluid streams to be emitted from the plurality of spray nozzles 220.

According to another aspect, as the vehicle contacts the brush assembly 200 and continues forward, the brush assembly 200 may be pushed by the vehicle such that it begins to pivots rearwardly. The brush assembly 200 may continue to be pushed rearwardly until it is pushed beneath the level of the vehicle in it its second position in the pit 214. Alternatively, the controller can direct the brush assembly 200 to move to the second position in the pit 214 when the vehicle has moved the brush assembly 200 a certain predetermined distance rearwardly.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A brush assembly for treating an exterior surface of a vehicle, comprising:
   a base portion;
   a treatment portion connected to the base portion, the treatment portion including a first brush portion having a first backing member and a plurality of wash media elements disposed on the first backing member;
   a movement mechanism including a controller in communication with a link arm portion to effectuate movement of the treatment portion and contact between the wash media elements and the vehicle exterior;
   at least one spray nozzle disposed on the first brush portion adjacent the first backing member and configured to emit fluid away from the first backing member onto the vehicle exterior, wherein the at least one spray nozzle is rotationally fixed relative to the first backing member and configured for concurrent rotation with the backing member in response to rotation of the first backing member;
   wherein the at least one spray nozzle is in sealed fluid communication with at least one fluid supply line;
   wherein the at least one spray nozzle defines an outlet having an outlet axis, wherein the outlet axis is oriented at an oblique angle relative to an axis of rotation of the first backing member, wherein fluid is emitted along a direction corresponding to the oblique angle;
   wherein the plurality of wash media elements are disposed on the first backing member such that they surround the at least one spray nozzle and allow a fluid stream emitted from the at least one spray nozzle to pass through the wash media elements to the vehicle exterior;

wherein the plurality of wash media elements define a pocket on the first backing member devoid of wash media elements, wherein the outlet axis extends through the pocket without intersecting the plurality of wash media elements;

whereas the treatment portion is configured to move transversely with respect to the vehicle exterior to effectuate contact of the wash media elements with the vehicle exterior.

2. The assembly of claim 1, wherein the at least one spray nozzle is disposed at an angle such that the fluid stream is emitted at an angle away from a center of the first backing member.

3. The assembly of claim 1, further comprising:
a plurality of spray nozzles disposed on the first brush portion adjacent the first backing member, with each of the plurality of nozzles configured to emit a separate fluid stream so that multiple fluid streams are emitted at an angle away from the center of the first backing member.

4. The assembly of claim 3, wherein the plurality of spray nozzles are disposed adjacent a middle portion of the first backing member and located in at least one opening formed in the middle portion of the first backing member.

5. The assembly of claim 1, wherein the treatment portion includes a second brush portion having a second backing member and a plurality of wash media elements disposed on the second backing member;
at least one spray nozzle disposed on the second brush portion adjacent the second backing member and configured to emit fluid away from the second backing member onto the vehicle exterior;
wherein the plurality of wash media elements are disposed on the second backing member such that they surround the at least one spray nozzle and allow a fluid stream emitted from the at least one spray nozzle to pass through the wash media elements to the vehicle exterior.

6. The assembly of claim 5, wherein the at least one spray nozzle disposed adjacent the second backing member is disposed at an angle away from a center of the second backing member.

7. The assembly of claim 5, further comprising:
a plurality of spray nozzles disposed adjacent the second backing member, with each of the plurality of nozzles configured to emit a separate fluid stream so that multiple fluid streams are emitted at an angle away from a center of the second backing member.

8. The assembly of claim 7, wherein the plurality of spray nozzles are disposed adjacent a middle portion of the second backing member and located in at least one opening formed in the middle portion of the second backing member.

9. The assembly of claim 1, wherein the treatment portion is pivotally connected to the base portion and is biased at an angle with respect to a vehicle treatment area such that the at least one spray nozzle may emit high pressure fluid onto a front forward facing surface of a vehicle as the vehicle approaches.

10. The assembly of claim 1, wherein the treatment portion is biased inwardly so as to engage the exterior surface of the vehicle such that the fluid stream emitted from the at least one spray nozzle is directed onto the exterior surface at close range.

11. The assembly of claim 1, wherein the plurality of wash media elements are oriented generally parallel to a center line passing through the center of the first backing member.

12. The assembly of claim 11, wherein the plurality of wash media elements are substantially self-supporting along their length.

13. The assembly of claim 1, wherein the first backing member is formed of a flexible material having memory properties such that it is configured to flex away from the vehicle exterior and return.

14. The assembly of claim 3, further comprising:
a plurality of pockets formed on a region of the first backing member devoid of wash media elements with each of the pockets being delimited by the plurality of wash media elements with each of the plurality of pockets receiving an individual one of the plurality of spray nozzles to allow the fluid streams emitted from the plurality of spray nozzles to flow outwardly without substantial contact with surrounding wash media elements.

15. The assembly of claim 14, wherein said plurality of spray nozzles includes three spray nozzles and three corresponding pockets receiving said three spray nozzles.

16. The assembly of claim 1, wherein the base portion includes a hollow passageway therein that allows the high pressure fluid to flow from a source of fluid to the at least one spray nozzle.

17. The assembly of claim 1, wherein the first brush portion is configured such that the plurality of wash media elements entrap the fluid stream within pockets bounded by the wash media elements while in engagement with the exterior surface of the vehicle.

* * * * *